United States Patent [19]

Doyen

[11] Patent Number: 4,618,527
[45] Date of Patent: Oct. 21, 1986

[54] GOOD MACHINEABILITY FILM STRUCTURE

[75] Inventor: Rene H. Doyen, Pittsford, N.Y.

[73] Assignee: Mobil Oil Corporation, New York, N.Y.

[21] Appl. No.: 805,633

[22] Filed: Dec. 6, 1985

[51] Int. Cl.$^4$ .......................... B32B 7/02; B32B 7/12; B32B 27/00
[52] U.S. Cl. .................................. 428/213; 428/509; 428/510; 428/516; 428/520; 428/910
[58] Field of Search ............... 428/213, 508, 509, 510, 428/516, 520, 910

[56] References Cited

U.S. PATENT DOCUMENTS

| | | | |
|---|---|---|---|
| 4,419,410 | 12/1983 | Weiner | 428/516 |
| 4,419,411 | 12/1983 | Park | 428/516 |
| 4,438,176 | 3/1984 | Steiner et al. | 428/518 |
| 4,560,609 | 12/1985 | Fukushima et al. | 428/516 |
| 4,578,316 | 3/1986 | Clauson et al. | 428/516 |
| 4,590,125 | 5/1986 | Balloni et al. | 428/516 |

OTHER PUBLICATIONS

Technical Data Sheet, A. Schulman, Inc., Jul. 18, 1985, "Polybatch ASPA 2446".

Primary Examiner—William J. Van Balen
Attorney, Agent, or Firm—A. J. McKillop; M. G. Gilman; J. P. O'Sullivan, Sr.

[57] ABSTRACT

A biaxially oriented film structure comprising (I) a comparatively thick base layer of a thermoplastic resin containing: an antistatic combination of (a) a compound of the formula $RN(R_1)_2$ wherein R is a $C_6$-$C_{24}$ alkyl group; $R_1$ is H $(OCH_2CH_2)_n$; n=1–25; and (b) a monoester of an aliphatic $C_2$-$C_8$ polyhydric alcohol and a $C_{12}$-$C_{24}$ fatty acid; and a slip improving proportion of (c) a $C_{12}$-$C_{24}$ fatty amide; and (II) a comparatively thin surface layer on at least one surface of (I), said surface layer comprising a thermoplastic resin containing an anti-block and COF reducing proportion of a finely divided inorganic material. This structure can be laminated to another film such as a polymeric film or a paper film such as glassine.

16 Claims, No Drawings

GOOD MACHINEABILITY FILM STRUCTURE

The present invention relates to a transparent oriented multilayer film structure having a low haze percentage, excellent non-blocking properties, a consistently low friction value both as an unsupported film and after being subjected to subsequent operations such as printing, lamination to other films, etc.

Polypropylene films are widely used in the packaging industry due to their physical properties, such as, transparency, stiffness, excellent moisture barrier characteristics, etc. With all of its good characteristics, unmodified polypropylene film has the disadvantageous properties of a high inherent coefficient of friction and film-to-film destructive blocking on storage. The high film-to-film coefficient of friction makes it very difficult to be successfully employed in automatic packaging equipment. Even with some films, of the type which will be disclosed herein, conventional coefficient of friction values do not provide a sound basis for predicting the so-called "machineability" characteristics of a film in conventional form, fill and seal packaging machinery. In such cases, the film will not respond to the packaging speed capability of the system and, as a consequence, jamming and/or noisy operation results.

In the past, coefficient of friction characteristics of polypropylene and other thermoplastic films have been beneficially modified by the inclusion in the polymer of fatty acid amides, more particularly, erucamide and oleamide. The effectiveness of this type of material depends upon its ability to migrate to the surface of the films in order to reduce the coefficient of friction. Both of the aforementioned amides are commonly used for reducing coefficient of friction. The development of the desired low coefficient of friction value is strongly dependent upon the type and amount of amides, and time and temperature aging effects. Even the heat history the film has been exposed to while in storage and shipping and during subsequent converter processes, significantly affects the coefficient of friction. In addition, the presence of these types of fatty acid amides on the film surface results in visible adverse effects on the film appearance, manifested by an increase in haze, a decrease in gloss and the presence of streaks. These materials also adversely effect the wettability and adhesion of solvent and water-based inks, coatings and adhesives.

In the case of oriented polypropylene films which are widely used in the food packaging industry, it is common to laminate this film with itself or with other thermoplastic films or with paper films such as glassine paper. When oleamide or erucamide are used in the polypropylene films a significant increase in coefficient of friction has been observed after lamination to such films. It is theorized that this is due either to the migration of the amide back into the polypropylene film or to the loss of the additive layer at the film surface. Therefore, these types of oriented laminated polypropylene films have limited usage for particular converting processes. Attempts to replace these amides types to provide a consistent coefficient of friction have not been successful.

In U.S. Pat. No. 4,533,509, there is described a multilayer structure comprising a comparatively thick base layer of an optically clear thermoplastic resin and a comparatively thin surface layer containing a finely divided inorganic material in a proportion sufficient to thereby impart anti-block characteristics and decrease film-to-film coefficient of friction. The resulting film has non-blocking and improved slip characteristics and these are more stable regarding heat history without any adverse effects on appearance, wetting and adhesion that is typically experienced with amide-modified films. However, when laminated to other films, e.g. glassine paper, such structures exhibit significantly higher coefficient of friction values and cannot be used in conventional form, fill and seal machines.

It is an object of the present invention to provide a film having a consistently low coefficient of friction which accurately forms a basis for the "machineability" of the film in commercial packaging machinery.

It is another object of the present invention to provide a film having superior non-blocking characteristics.

It is yet another object of the present invention to provide a film having non-blocking and improved slip characteristics which are more stable with regard to the heat history of the film.

It is still another object of the present invention to provide a film having non-blocking, and improved slip characteristics which are maintained upon lamination of the film to other films.

SUMMARY OF THE INVENTION

According to the present invention there is provided a biaxially oriented film structure comprising:

(I) a comparatively thick base layer of a thermoplastic resin containing an anti-static combination of (a) an $RN(R_1)_2$ wherein R is a $C_6$–$C_{24}$ alkyl group; $R_1$ is H $(OCH_2CH_2)_n$; n=1–25; and (b) a monoester of an aliphatic $C_2$–$C_8$ polyhydric alcohol and a $C_{12}$–$C_{24}$ fatty acid; and a slip-improving proportion of (c) a $C_{12}$–$C_{24}$ fatty amide; and (II) a comparatively thin surface layer on at least one surface of (I), said surface layer comprising a thermoplastic resin containing an anti-block and COF reducing proportion of finely divided inorganic material.

In a preferred form of the invention the described film structure is laminated to or supported by a different film.

DETAILED DESCRIPTION OF THE INVENTION

In general, the present invention can be practiced with any thermoplastic film, for example, the polyolefins in general, and specifically, polymers, copolymers and blends of ethylene, propylene, butylene, etc., polyesters, such as, polyethylene terephthalate, acrylic polymers and copolymers and the like. The basic film structures of the present invention find utility when supported or laminated to another film in order to accommodate a particular end use. Thus, polymer films different from the base film or paper films can be laminated to the base structure for particular purposes. Such polymeric films include any thermoplastic film different from the base film. Examples of paper films include glassine paper, which is a thin dense paper which is highly resistant to the passage of air and oils.

Particularly preferred polymers employed as the base film herein are the polypropylenes which are highly isotactic. The preferred polypropylenes are well known in the art and are formed by polymerizing propylene in the presence of stereospecific catalysts systems. They can have a melt index at 230° C. ranging from about 0.1–25. The crystalline melting point is about 160° C. The number average molecular weight ranges from about 25,000 to 100,000. The density ranges from about 0.90–0.91.

As indicated above, the core or base substrate of the film structures of the present invention will contain two anti-static compounds and a slip additive. The individual components of the anti-static combination can be present in any proportion which will effectively cope with static problems to an extent greater than that of the individual components of the combination present in a like amount. As a general guide component (a) i.e. the amine $RN(R_1)_2$ can be present in from about 200 to 1000 ppm. The component (b), i.e. the monoester, can be present in the base resin in from 500 to 10,000 ppm.

The slip agent, component (c), i.e. the $C_{12}$–$C_{24}$ fatty amide, can be present in the base layer in a proportion which in combination with the dual anti-static combination will effectively reduce the drag resistance of the film structure in commercial packaging machinery in its unsupported or its supported form. By this is meant in its unlaminated or laminated form. As a more specific guideline, the fatty amide can be present in from about 200 to about 2000 ppm. All parts are parts by weight based upon the weight of the core or substrate film.

The anti-static agent combination and the slip improving fatty amide can be introduced into the resin material of the core layer in any convenient way. A master batch formulation can be prepared in which a significantly high ratio of the additives are melt blended into the base resin, the formulation cooled and, thereafter, subdivided into a pellet form. This master batch can be incorporated into the diluting resin for film making and the proportions adjusted so as to accomplish the most effective reduction in noise and film drag when employed in commercial packaging machinery.

Within the scope of the tertiary amine component (a), are those compounds wherein the aliphatic amine is an alkenyl or mixed alkenyl and alkyl ($C_6$–$C_{24}$) amine. These amines are liquid at ambient temperatures and are obtained either from materials of synthetic origin or from distilled coco, soya, oleyl or tallow sources, or mixtures thereof. Examples of these amines are diethoxylated tallow (mixed alkenyl and alkyl) amine, and diethoxylated coco amine, which are marketed under the designations Armostat 310 and Armostat 410 respectively, by Armak Company, Chicago, Ill. For this type of amine a chain length of $C_6$ represents the demarkation between an acceptable and unacceptable product. From a functional standpoint, chain lengths of $C_{12}$–$C_{18}$ have been found to provide the most effective anti-static properties with the selected monoester of the present invention. Ethoxylated tertiary alkyl amines including between 2 and 50 (i.e. n=1–25), ethylene oxide units and fatty amines derived from $C_6$–$C_{24}$ saturated and unsaturated fatty acids are contemplated.

The monoester component of the anti-static combination is, as stated above, a monoester of an aliphatic $C_2$–$C_8$ polyhydric alcohol and a $C_{12}$–$C_{24}$ fatty acid. The polyhydric alcohols include the trihydric alcohol, glycerol, pentaerythritol and di and tri-pentaerythritol, trimethylolethane, trimethylopropane, butane triol, hexane triol, sorbitol, etc. As the fatty acids, the saturated or unsaturated acids of the $C_{12}$–$C_{24}$ series are contemplated.

As indicated above, the slip agent or film drag reducing agent is a $C_{12}$–$C_{24}$ fatty amide. Any single species or mixed species can be employed to achieve the effect obtained when employed in combination with the dual antistatic agents. A preferred fatty amide is stearamide. Other contemplated species include erucamide, oleamide, etc.

The finely divided inorganic material contemplated for inclusion in the surface or skin layer of the film structure is any material which not only can impart anti-block characteristics to the structure, but also can reduce the coefficient of friction of the subject polymer films in general without imparting objectionable haze to the structure. Contemplated finely divided inorganic materials include, Syloid, a synthetic amorphorous silica gel having the significant composition of 99.7% $SiO_2$; Super Floss, a diatomaceous earth of the composition $SiO_2$ 92%, $Al_2O_3$ 3.3%, $Fe_2O_3$ 1.2% having an average particle size of about 5.5 microns; anhydrous aluminum silicate sold as Kaopolite 1152 having the composition $SiO_2$ 55%, $Al_2O_3$ 44%, $Fe_2O_3$ 0.4% having an average particle size of about 0.8 microns; and synthetic precipitated silicates, such as Sipernat 44, having a composition of $SiO_2$ 42%, $Al_2O_3$ 36%, $Na_2O$ 22% having a 3.5 micron mean particle size. The finely divided inorganic materials can be present in the skin layer or layers in a proportion sufficient to inhibit film-to-film blocking. Generally this amount will range from about 0.1 to 2.0% by weight.

The skin layer or layers can range in thickness from the thinness continuous layer or layers possible to about 10% each of the overall thickness of the finished film composite.

The skin resins for the structures contemplated herein are formed by employing a commercially available intensive mixer, e.g. of the Bolling or Banbury-type. Mixers of this type are to be employed in mixing a concentrate of the finely divided inorganic material and the selected polymer until there is a uniform dispersion of the inorganic material in the polymer.

In the following Examples the coefficient of friction values are determined according to the procedure of ASTM D1894-78. Static half-life decay values are determined according to ASTM F365-76. This test can be conducted with commercially available standard equipment. A supplier of this equipment is ElectroTack Systems, Inc. of Glenside, Pa. The blocking values referred to herein were measured after film conditioning for 72 hours at 125° F. under 100 psi pressure.

In the employment of a fatty amide slip agent in a packaging film such as oriented polypropylene, the film-to-film COF value normally is a good indicator of the acceptability of the film from a "machineability" standpoint in commercial form fill and seal machines. For example, a COF level of greater than 0.4 normally would be a valid indication that the film would not be acceptable. With such a high COF level, the film would in all probability have excessive drag, high squeal and ultimately cause jamming of the machinery. However, with films of the type disclosed in U.S. Pat. No. 4,533,509 (the disclosure of which is incorporated herein in its entirety), but modified so as to include a fatty acid amide slip agent therein, its film-to-film COF is not a reliable indicator of the acceptability of such a film from a "machineability" standpoint. In spite of a COF reading of less than 0.4, such a film would possess excessive drag and squeal in such commercial machinery. A possible explanation of this is given hereinafter.

When film passes through the forming collar region of a commercial form, fill and seal machine, for example, a Mira-Pak Miramatic Model L (Houston, TX), a "force over forming collar" (FOFC) value can be obtained. This value is obtained by measuring the drag force in pounds revealed by manually pulling the film through the forming collar region. The force in pounds can be obtained by employing a simple spring resistance scale having a hook at one end. The film is gathered or affixed to the hook and the film pulled through the forming collar region while reading the drag force in pounds. Depending upon film gauge, a high or low reading will indicate poor or good "machineability" respectively. Employing a 0.75 mil thick film, the drag force of a 6 inch diameter roll of film would barely register on the scale indicating that very little force is necessary to merely unroll the film from the roll. However, when pulled through the forming collar of the apparatus, because of the machine surface-to-film contact and the changing attitude of the film, the drag force will easily show a figure greater than 8 pounds. As this drag force increases because of adverse changes in the composition of the film, a point will be reached where the film will squeal and subsequently break during passage through the packaging machine. At a level above about 14 pounds, an unsupported 0.75 mil film is sure to cause machine down time because of excessive noise or jamming. For a supported film of a thickness of from 2.5–3.0 mils this level is about 30 pounds.

EXAMPLE 1

A skin resin containing 99.45% by weight of a 4.5 melt flow index polypropylene homopolymer, identified as 040R from U.S.S. Chemical Company and 0.25% by weight of a precipited sodium-aluminum-silica of the following analysis, $SiO_2$ 42%, $Al_2O_3$ 36%, $Na_2O$ 22%, having a 3.5 micron mean particle size, and 0.3% by weight of Kaopolite 1152, and anhydrous aluminum silicate of the following analysis $SiO_2$ 55%, $Al_2O_3$ 44%, $Fe_2O_3$ 0.4% having a 0.8 micron mean particle size were intimately melt-mixed in a Banbury mixer until the inorganic components were uniformly dispersed in the molten polypropylene. The melt was fed into a pelletizing extruder and formed into solid pellet resin.

A three layer film structure was formed by feeding the above-described composition into a satellite extruder that feeds the two outer layers of a three-layer slot die. Polypropylene core layer resin was fed into the main extruder that feeds the center (core) layer of the same die and a three layer molten sheet was cast from the die onto a cooling drum and quenched to a temperature between about 30°–50° C. The sheet measured about 35 mils thick and was composed of top and bottom layers which were approximately 5% each of the overall structure thickness. The sheet was thereafter reheated to a temperature between about 130°–170° C. and stretched 500–600% in the machine direction, then 800–900% in a transverse direction on a commercially available tenter orienting apparatus. The finished film was about 0.75 mils thick. This structure was corona discharge treated on both sides thereof to improve the wettability and adhesion of ink and adhesives. The structure was then reversed printed using a commercially available water base ink. Subsequently part of the film structure was laminated by means of a low density polyethylene adhesive to a 1.6 mil thick glassine paper.

The film structures had the following properties:
A. Unsupported/Unprinted Film:
   COF: approximately 0.35–0.40
   Static half-life decay: greater than 3 minutes
   Blocking: 7 g/inch
   Wettability: excellent
   COF: after short dwell conditioning at 210° F. = approximately 0.35.
B. Printed/Unsupported Film
   COF: approximately 0.35
C. Water-based Ink Printed and Glassine Laminated Film
   COF: greater than 0.50

The unlaminated and laminated structures were then tested on a Mira-Pak Miramatic Model L vertical form, fill and seal packaging machine and the results are given in the Table below.

EXAMPLE 2

A film structure was prepared as in Example 1 except that the base or core layer contained 1500 ppm of stearamide, available as Kenamide S from Humko Chemical Division, Memphis, Tenn. After film orientation, it was corona discharge treated on both sides, printed and some of the film laminated to glassine paper as in Example 1. The structures have the following properties:
A. Unsupported/Unprinted Film
   COF: approximately 0.28
   Static half-life decay: greater than 3 minutes
   Blocking: 7 g/inch
   Wettability: excellent
   COF: after short dwell conditioning at 210° F.: approximately 0.28
B. Printed/Unsupported Film
   COF: approximately 0.28
C. Printed and Glassine Laminated Film
   COF greater than 0.50

EXAMPLE 3

The process of Example 2 was repeated except that the base layer contained, in addition, to the fatty amide, 1,000 ppm of N,N'-bis(2 hydroxyethyl) stearylamine, available as Hexcel 273E from Hexcel Chemical Products, Zeeland, Mich. and 2500 ppm of glycerol monostearate available as Atmul 84 S from Kraft, Inc., Memphis, Tenn.

The film combination was oriented, both sides corona discharge treated, printed and part of the film structure was laminated as in the preceding examples.
A. Unsupported/Unprinted Film
   COF approximately: 0.23
   Static half life decay: better than 20 seconds.
   Blocking: 0.4 g/inch
   Wettability: excellent
   COF film-to-film after short dwell conditioning at 210° F.: approximately 0.25.
B. Printed/Unsupported Film
   COF approximately 0.25
C. Printed and glassine laminated film
   COF lower than 0.35

The following Table shows the improvement in the "force-over-forming-collar" value of the several examples in comparison with the coefficient of friction value for both the unsupported and the supported films.

TABLE

|  | Unsupported Film | | Supported Film | |
| --- | --- | --- | --- | --- |
|  | COF | FOFC | COF | FOFC |
| Example 1 | 0.35–0.40 | 25 lbs. | >0.55 | >50 lbs. |
| Example 2 | 0.28 | 14 lbs. | >0.55 | 37 lbs. |
| Example 3 | 0.23 | 11 lbs. | <0.35 | 25 lbs. |

The data of the above Table shows that the unsupported film of Example 1 has a COF value of 0.35 to about 0.40 and as indicated above, normally such a coefficient of friction value would indicate that this film would be able to be satisfactorily handled by a commercial form, fill and seal machine without excessive noise, i.e. high squeal or without jamming due to excessive drag or film breakage. As shown, however, the FOFC value is 25 lbs. and this is considerably above the borderline figure of about 14 lbs. which indicates that a film cannot be reliably employed in such machinery. In otherwords, the film of Example 1 has poor "machineability". Example 2 also shows that in spite of an acceptable COF of 0.28 the machineability of the film as shown by the FOFC value is 14 lbs. This film in all likelihood would cause unacceptable downtime. Example 3 shows a film having a comparatively low COF value, i.e. 0.23. This film also had a FOFC value of 11 lbs. This figure indicates that there will be high reliability when employing such a film in the type of machinery described. When employing the supported film in the same material, the borderline for FOFC is higher because the strength of the lamination is greater. This is because the glassine film is approximately 1.6–1.8 mils thick and it is laminated to the base film by a 0.5 mil linear low density polyethylene (LDPE) adhesive. Thus, the total composite film thickness begins to approach 2.5–3 mils. With such a thickness, experience has shown that an FOFC value of greater than 30 will clearly risk machine downtime because of machine jamming and high squeal. Example 3 shows a comparatively low coefficient of friction of less than 0.35 and a FOFC figure of 25 lbs. Thus, the laminated film of Example 3 can be employed in the apparatus described with high reliability.

It is to be understood that as different vertical form, fill and seal machinery is employed the base line value for FOFC can change. In some cases, it will be higher than that stated herein for the particular machinery employed and in other cases it may be lower. In any event the general relationship will hold true.

Thus, by the present invention, it has been shown that by the employment of a dual anti-static agent of the type defined in combination with a fatty amide of the type described, both unsupported films and supported films can be employed with high reliability in the type of apparatus described.

What is claimed is:

1. A biaxially oriented film structure comprising:
   (I) a comparatively thick base layer of a thermoplastic resin containing: an anti-static combination of
      (a) a compound of the formula $RN(R_1)_2$, wherein R is a $C_6-C_{24}$ alkyl group; $R_1$ is H $(OCH_2CH_2)_n$; $n=1-25$; and (b) a monoester of an aliphatic $C_2-C_8$ polyhydric alcohol and a $C_{12}-C_{24}$ fatty acid; and a slip improving proportion of (c) a $C_{12}-C_{24}$ fatty amide; and
   (II) a comparatively thin surface layer on at least one surface of (I), said surface layer comprising a thermoplastic resin containing an anti-block and COF reducing proportion of a finely divided inorganic material.

2. The structure of claim 1 wherein the combined anti-static effect of (a) and (b) is greater than that resulting from an equivalent weight of either (a) or (b) individually.

3. The structure of claim 2 wherein the thermoplastic resin of the base layer and of the surface layer is a polyolefin.

4. The structure of claim 3 wherein the polyolefin of said layers is polypropylene.

5. The composition of claim 4 wherein R is stearyl or a coco or tallow derivative.

6. The structure of claim 5 wherein said monoester is glycerol monostearate.

7. The structure of claim 1 wherein the inorganic material has a mean particle size of from about 0.2 to about 5.0 microns.

8. The structure of claim 7 wherein the thermoplastic resin of the base layer and of the surface layer are different.

9. The structure of claim 7 wherein the inorganic material is a member selected from the group consisting of an aluminum silicate; and mixtures thereof.

10. The structure of claim 9 wherein the surface layer of the oriented structure is in a thickness ranging from the thinnest continuous film possible to about 10% of the thickness of the overall structure.

11. The structure of claim 10 wherein said inorganic material is a sodium-aluminum silicate.

12. The structure of claim 1 wherein said thermoplastic resin is polypropylene (a) is N,N'-bis-(2-hydroxyethyl) stearyl amine, (b) is glycerol monostearate (c) is stearamide and said surface layer contains a member selected from the group consisting of an aluminum silicate, sodium-aluminum silicate and mixtures thereof.

13. The structure of claim 1 laminated to another film.

14. The structure of claim 1 laminated to a glassine film.

15. The structure of claim 14 wherein said glassine film is laminated to the structure by way of an adhesive.

16. The structure of claim 12 laminated to a glassine film.

* * * * *